Figure 1:
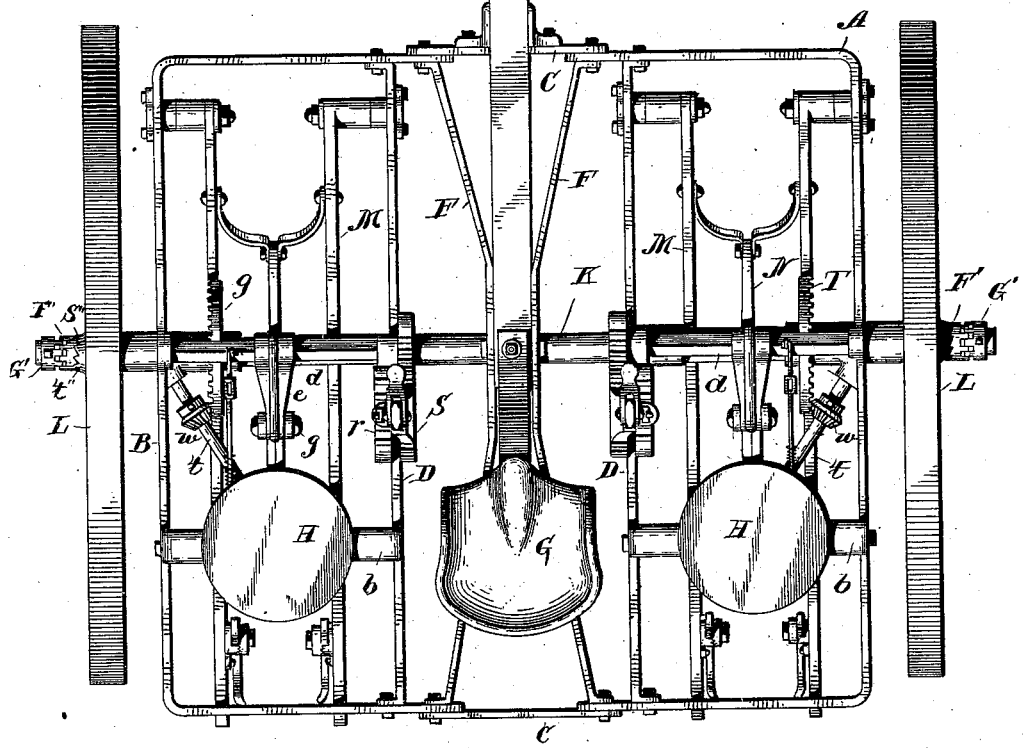

No. 613,930. Patented Nov. 8, 1898.
F. K. LATHROP.
DOUBLE ROW PLANTER.
(Application filed Jan. 21, 1898.)

(No Model.) 2 Sheets—Sheet 1.

Witnesses
Bernard J. Hausfeld
J. G. Edwards.

Inventor
Frank K. Lathrop
by Alfred M. Allen
Attorney

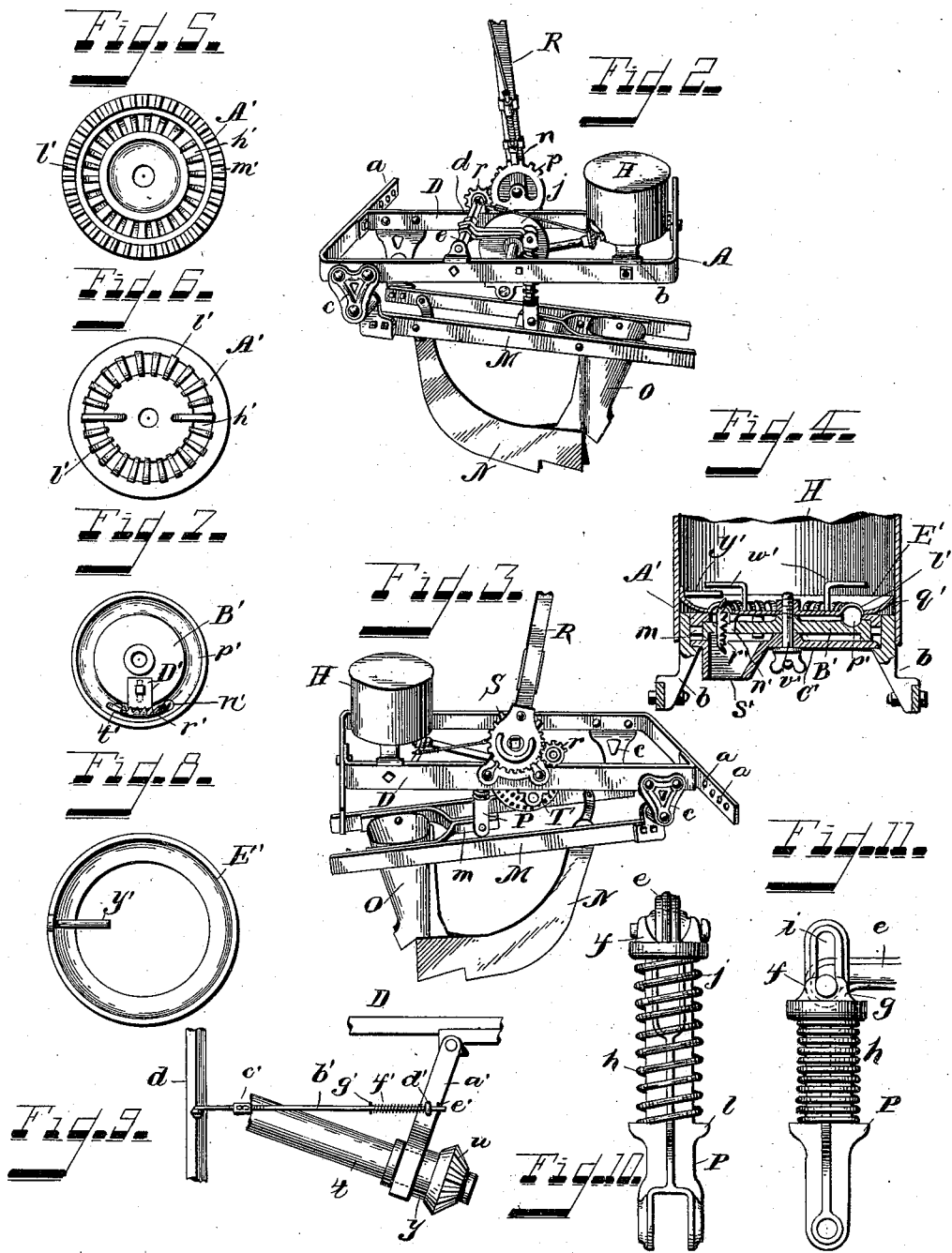

UNITED STATES PATENT OFFICE.

FRANK K. LATHROP, OF DAYTON, OHIO, ASSIGNOR TO THE OHIO RAKE COMPANY, OF SAME PLACE.

DOUBLE-ROW PLANTER.

SPECIFICATION forming part of Letters Patent No. 613,930, dated November 8, 1898.

Application filed January 21, 1898. Serial No. 667,427. (No model.)

*To all whom it may concern:*

Be it known that I, FRANK K. LATHROP, a citizen of the United States, residing at Dayton, in the county of Montgomery and State of Ohio, have invented certain new and useful Improvements in Double-Row Planters, of which the following is a full, clear, and exact description, reference being had to the accompanying drawings, forming part of this specification.

My improvements relate to agricultural implements for use in planting cotton-seed, corn, and other seeds, and they have especial relation to implements for planting two rows of corn or cotton-seed simultaneously, in which the implement can be readily and easily adjusted laterally to vary the width of rows and in which the cotton-seed-feeding devices are so designed and arranged that they can be at a moment's notice interchanged for the corn-feed mechanism and the implement used for planting either corn or cotton-seed, as desired. In addition to these main features of improvement there are sundry other novel and useful features of construction, which will be hereinafter more particularly pointed out and claimed.

In the drawings, Figure 1 is a top plan view of my improved double-row planter. Fig. 2 is a perspective view of the left-hand runner and hopper section of the planter, taken from the outside. Fig. 3 is a similar view of same, taken from the inside. Fig. 4 is a vertical section through the cotton-seed-feed mechanism of the seed-hopper. Fig. 5 is a bottom plan view of the cotton-seed-feed revolving plate. Fig. 6 is a top plan view of same. Fig. 7 is a similar view of the cotton-seed-feed stationary plate. Fig. 8 is a similar view of the guard-ring for the cotton-seed hopper. Fig. 9 is a detail top plan view of the disengaging mechanism for the feed-shaft. Figs. 10 and 11 are front and side views of the pressure-spring and its connections for the runners.

The framework of the planter is made up of the bars A B, bolted together by the connecting-bars C C to form a solid rectangular frame. The inner ends of the bars A B are formed with a series of holes $a\ a$, and the width of the frame may be varied to bring the working parts of the implement nearer together or farther apart by adjusting the connecting-bars C C by these openings $a\ a$.

D D are longitudinal bars bolted between the front and rear of the framework, forming two small frames for the reception of the working parts.

E is the tongue or draft-pole of the implement, securely bolted to the central portion of the frame and to the brace-bars F F, which are bolted lengthwise of the frame, between the ends of the two halves thereof, to further strengthen and brace the framework.

G is the driver's seat, secured on the usual spring-bar to the end of the draft-pole E, and H H are the seed-hoppers, supported on the standards $b\ b$, bolted between the bars D D and A B.

K is the carrying-axle, provided with the carrying-wheels L L, journaled in suitable boxes on the framework.

M M are the drag-bars, pivoted in suitable hangers $c\ c$, secured to the frame and carrying the runners N, with the conducting-tubes O secured thereto.

The various working parts are duplicated for each half of the machine, and the description of the one half will apply to the other half.

Journaled in suitable boxes on the frame for each side of the machine is the shaft $d$, carrying the arm $e$, secured thereto at the center. The outer end of this arm is coupled by cap $f$ and pin $g$ within the slot $i$ in the upper end of connecting-bar P, while the coiled spring $h$ bears between the cap $f$ and shoulders $l$ on the connecting-bar P. The lower end of this connecting-bar P is coupled to the drag-bars by the bar $m$, bifurcated and bolted to the drag-bars at each side of the conducting-tube.

R is a hand-lever pivoted on the frame and provided with the usual spring-latch $n$, taking into the segment-rack $p$, secured on the frame, to lock the lever in any desired position. The lower end of this lever carries a gear S, meshing with the pinion $r$, mounted on the shaft $d$, so that as the gear S is rotated by the lever R the shaft $d$ will be rotated to bring pressure to bear on the drag-bars and runner to drive same into the ground, the arm $e$ compressing the coiled spring to obtain this pressure and the connecting-bar P being provided with the recess $j$ to allow for this movement of the arm $e$. The adjustment of the lever in the other direction will raise the drag-bars and runner from the ground, the pin $g$ engaging the arm P at the upper end of the slot $i$.

Mounted on the carrying-axle K is the gear-wheel T, provided with the usual series of concentric teeth to vary the rate of speed of the feeding device.

$t$ is a feed-shaft journaled at one end in a suitable box and carrying the beveled pinion $u$ at the other end, meshing with the feed-gear of the seed-hopper, as will be hereinafter described. The feed-shaft $t$ is rotated by the beveled pinion $w$, secured thereon by set-screws, so as to be adjustable to mesh with any one of the gears on the gear T, as will be described.

The beveled pinion $u$ is provided with a grooved collar $y$, engaged by the forks of the bifurcated arm $a'$, pivoted to the frame.

$b'$ is a rod provided with the turnbuckle thereon for adjusting its length and coupled to the shaft $d$ at one end and passing through the eye $d'$ on the bifurcated arm $a'$ and held therein by a pin $e'$, while $f'$ is a coiled spring bearing between the pin $g'$ and the eye $d'$. It will be evident from this that as the shaft $d$ is rotated to raise the drag-bars and runner from the ground the draft on the rod $b'$ will disengage the beveled pinion $u$ from the feed-gear of the seed-hopper.

One of the chief features of my invention relates to the improvement in feeding devices for the planting of cotton-seed now to be described, and the arrangement has special importance because the parts are so designed and arranged that they are interchangeable with corresponding parts of any of the well-known forms of corn-feeding mechanism.

My improvements are especially designed to provide a simple and effective construction whereby the corn-seed plate and corn-feeding devices may be exchanged at a moment's notice for the cotton-seed-feed plate and feed-wheel when it is desired to employ the corn-planter for the planting of cotton-seed. To accomplish this result, the cotton-seed plate A' is constructed of the same shape and size as the corn-seed plate of the corn-planter, with the seed-openings therefor in the same relative position as in the corn-seed plate, an annular opening $h'$ being cut therein for the passage of the cotton-seed. This opening is protected by the radial arched bars $l'$, while the base of the plate A' is formed with gear-teeth $m'$, which mesh with the beveled gear $u$ of the feed-shaft $t$, and by means of which the plate is rotated just as the corn-seed plate is rotated in the corn-hopper. As a substitute for the corn-feed base-plate for the cotton-seed-feed devices I employ the plate B', provided with an annular groove $p'$, corresponding to the annular opening $h'$ of the seed-plate A'. A slot $n'$ is cut in this plate B' in the base of the groove $p'$, within which is mounted, on a stud having its bearing in one side of the slot, a spurred concavo-convex feed-wheel $r'$, the spurs of the wheel taking up between the radial bars $l'$ of the seed-plate. As the seed-plate A' is rotated by the feed-shaft $t$ the spurred wheel will be thus rotated thereby, and the cotton-seed passing through the openings between the bars $l'$ and lying in the groove $p'$ will be carried around and caught by the spurred wheel and fed down through the slot $n'$ into the discharge-opening $s'$ in the base-plate C' of the hopper, where it is carried by the usual conducting-tube to the ground. In order to prevent the cotton-seed from crowding in and blocking the feed-wheel as the cotton-seed is carried around in the groove $p'$ between the plates, I provide a finger $t'$, secured at the edge of the slot $n'$ and extending up over the wheel $r'$ a short distance.

D' is a gage-plate secured in a slot in the plate B' and adjustable to and from the opening $n'$, so as to regulate the feed of the feed-wheel. When the gage-plate is away from the slot $n'$, the cotton-seed will feed through the side of the slot as well as at the end; but when this side opening is blocked by the adjustment of the gage-plate the spurred wheel will only feed one seed at a time through the end of the slot.

On top of the seed-plate A' and secured to the sides of the hopper is the ring E', sloping toward the center. This ring may be a permanent part of the hopper or a separate piece, as desired, and the shape of same tends to carry the cotton-seed toward the opening in the seed-plate.

To prevent the cotton-seed from arching over the seed-openings and to keep it constantly stirred, stirrer-arms $w'w'$ are attached to the rotating seed-plate A', which coöperate with the fixed arm $y'$, attached to the ring E' or to the hopper.

The different plates of the feed mechanism are held together by the screw $v'$, provided with nut at one end and thumb-screw at the other.

It will be evident from the construction of the cotton-seed-feed devices that any of the well-known constructions of corn-feeding mechanism can be readily constructed of such shape that the plates of one can be at once substituted for the plates of the other, so that the implement can be manufactured with two sets of feed-plates and the machine used for planting corn or cotton-seed, as desired.

In order that in turning corners at the end of a field one of the carrying-wheels L may continue to revolve while the other comes to a rest, I mount the wheels L L loosely on the axle K and form a clutch-face $s''$ on the outer face of each hub $t''$ of these wheels.

F' is a sliding collar on the end of the axle, interlocking with the fixed collar G' and having ratchet-teeth on its inner face to engage the ratchet-teeth on the hubs of the wheels.

A coiled spring (not shown) bears between the fixed collar G' and the sliding collar to keep same in engagement with the wheel-hub, but to allow the collar F' to slide back and permit the axle to revolve without moving the wheel.

Having thus described my invention, what I claim, and desire to secure by Letters Patent, is—

1. In a double-row planter, a framework therefor made in two parts, each part carrying a similar set of operating devices, and having inner approaching ends arranged with a series of holes, draft-pole centrally located between said duplicate frames, with brace-rods attached thereto and to the inner contiguous ends of said frames, bars connecting together the ends of said brace-rods and the inner ends of said frames, and bolts for simultaneously uniting said brace-rods, bars and frame ends together, whereby the frame may be adjustably secured to permit lateral movement to vary the width of the rows, substantially as shown and described.

2. In a cotton-seed-feed attachment for planters, a bottom plate provided with an annular groove to hold and carry the cotton-seed, and a rotating seed-plate, with corresponding annular opening therein, to allow for the passage of the cotton-seed, and feed-wheel, and a slot in the bottom plate through which the cotton-seed is fed, and means for rotating said seed-plate and feed-wheel, substantially as shown and described.

3. In a cotton-seed-feed attachment for planters, a bottom plate provided with an annular groove to hold and carry the cotton-seed, and a rotating seed-plate with corresponding annular opening therein to allow for the passage of the cotton-seed, with arched radial bars across said opening to protect same, spurred feed-wheel engaging said radial bars, and means for rotating said seed-plate, substantially as shown and described.

4. In a cotton-seed-feed attachment for planters, a bottom plate provided with an annular groove to hold and carry the cotton-seed, and a rotating seed-plate with corresponding annular opening therein to allow for the passage of the cotton-seed, arched radial bars across said opening to protect the same, slot in the bottom plate through which the cotton-seed is fed, with spurred feed-wheel mounted in said slot and engaged by said radial bars, with means for rotating said seed-plate, substantially as shown and described.

5. In a planter, the combination, with the rock-shaft for the drag-bars, feed-shaft, and driving-gear for the seed-hopper free to move longitudinally thereon, of a lever pivoted to the frame and engaging said driving-gear, eye on said lever, with rod coupled to the rock-shaft and passing loosely through said eye in one direction, with pin on said rod to contact with said eye in the other direction, and spring acting between said rod and said lever, whereby the raising of the drag-bars will disconnect said driving-gear and the lowering thereof will reconnect same, substantially as shown and described.

FRANK K. LATHROP.

Witnesses:
W. H. H. ECKI,
E. J. FINKE.